(12) United States Patent
Gotou et al.

(10) Patent No.: US 8,870,131 B2
(45) Date of Patent: Oct. 28, 2014

(54) WIRING HARNESS FIXTURE

(75) Inventors: Hiroki Gotou, Kosai (JP); Takashi Nomoto, Kosai (JP)

(73) Assignee: Yazaki Corporation, Tokyo (JP)

( * ) Notice: Subject to any disclaimer, the term of this patent is extended or adjusted under 35 U.S.C. 154(b) by 0 days.

(21) Appl. No.: 13/064,932

(22) Filed: Apr. 27, 2011

(65) Prior Publication Data

US 2011/0272547 A1 Nov. 10, 2011

(30) Foreign Application Priority Data

May 6, 2010 (JP) ................................ 2010-106211

(51) Int. Cl.
| | | |
|---|---|---|
| F16L 3/08 | (2006.01) | |
| H01B 7/00 | (2006.01) | |
| F16B 19/00 | (2006.01) | |
| B60R 16/02 | (2006.01) | |
| F16B 21/08 | (2006.01) | |
| H02G 3/32 | (2006.01) | |

(52) U.S. Cl.
CPC .............. *H02G 3/32* (2013.01); *B60R 16/0215* (2013.01); *F16B 21/086* (2013.01); *Y10S 411/913* (2013.01)
USPC .................... 248/65; 248/71; 248/72; 248/73; 248/74.2; 248/49; 174/72 A; 174/480; 411/508; 411/509; 411/510; 411/913; 411/182; 24/453; 24/292

(58) Field of Classification Search
USPC .................... 248/65, 71, 73, 74.2, 72, 49, 56; 174/72 A, 480; 411/508–510, 913, 182; 24/453, 292
See application file for complete search history.

(56) References Cited

U.S. PATENT DOCUMENTS 3,991,960 A * 11/1976 Tanaka ........................ 248/68.1
4,325,526 A * 4/1982 Kitagawa ....................... 248/73
(Continued)

FOREIGN PATENT DOCUMENTS

| JP | S57-58921 U | 4/1982 |
|---|---|---|
| JP | 10-191537 A | 7/1998 |

(Continued)

OTHER PUBLICATIONS

Notification of the First Office Action mailed Jun. 4, 2013, issued for the Chinese patent application No. 201110116443.3 and English translation thereof.

(Continued)

*Primary Examiner* — Christopher Garft
(74) *Attorney, Agent, or Firm* — Edwards Wildman Palmer LLP

(57) ABSTRACT

A wiring clip 1 includes: an attaching portion 10 configured to be overlapped with a wiring harness; a locking portion 11 extended vertically from the attaching portion 10 and configured to be locked in a hole provided on a panel; and a pressing portion 12 configured to press the panel in a direction away from the attaching portion 10 when the locking portion 11 is locked in the hole. The pressing portion 12 includes: an inclined portion 19 continued to the attaching portion 10 and inclined with respect to both a vertically extending direction of the locking portion 11 from the attaching portion 10 and a longitudinal direction of the wiring harness overlapped with the attaching portion 10; and a parallel portion 20 continued to the inclined portion 19 and extended parallel to the locking portion 11 from the inclined portion 19. A surface 21a away from the panel of an intersecting portion 21 continued to both the inclined portion 19 and the parallel portion 20 is disposed further away from the panel than a surface 14a nearest the panel of the attaching portion 10.

3 Claims, 4 Drawing Sheets

(56) References Cited

U.S. PATENT DOCUMENTS

| | | | | |
|---|---|---|---|---|
| 4,457,482 A * | 7/1984 | Kitagawa | | 248/74.3 |
| 4,564,163 A * | 1/1986 | Barnett | | 248/71 |
| 4,669,688 A * | 6/1987 | Itoh et al. | | 248/74.2 |
| 4,681,288 A * | 7/1987 | Nakamura | | 248/71 |
| 4,795,116 A * | 1/1989 | Kohut et al. | | 248/73 |
| 4,840,334 A * | 6/1989 | Kikuchi | | 248/73 |
| 4,890,805 A * | 1/1990 | Morita | | 248/74.2 |
| 5,324,151 A * | 6/1994 | Szudarek et al. | | 411/510 |
| 5,592,720 A * | 1/1997 | Sasakawa et al. | | 24/453 |
| 5,601,260 A * | 2/1997 | Shinohara et al. | | 248/68.1 |
| 5,759,004 A * | 6/1998 | Kuffel | | 411/508 |
| 5,845,883 A * | 12/1998 | Meyer | | 248/73 |
| 6,320,134 B1 * | 11/2001 | Rehberg et al. | | 174/135 |
| 6,827,316 B1 * | 12/2004 | Arai | | 248/68.1 |
| 6,923,407 B2 * | 8/2005 | Takeuchi | | 248/73 |
| 7,019,215 B2 * | 3/2006 | Arai | | 174/72 A |
| 7,045,715 B2 * | 5/2006 | Ono | | 174/72 A |
| 7,404,548 B2 * | 7/2008 | Kwilosz | | 267/140.13 |
| 7,523,898 B1 * | 4/2009 | Barry et al. | | 248/71 |
| 2003/0189140 A1 * | 10/2003 | Takeuchi | | 248/71 |
| 2003/0213876 A1 * | 11/2003 | Takeuchi | | 248/71 |
| 2004/0182973 A1 * | 9/2004 | Kawai | | 248/71 |
| 2006/0175473 A1 * | 8/2006 | Takeuchi | | 248/71 |

FOREIGN PATENT DOCUMENTS

| | | |
|---|---|---|
| JP | 11-182742 A | 7/1999 |
| JP | 2000-041322 A | 2/2000 |
| JP | 2002-174210 A | 6/2002 |

OTHER PUBLICATIONS

Chinese Office Action dated Jan. 13, 2014 for corresponding Chinese Patent Application No. 201110116443.3.

Chinese Office Action dated Jul. 9, 2014 for corresponding Chinese Patent Application No. 201110116443.3.

* cited by examiner

WIRING HARNESS FIXTURE

CROSS REFERENCE TO RELATED APPLICATIONS

This application is on the basis of Japanese Patent Application No. 2010-106211, the contents of which are hereby incorporated by reference.

BACKGROUND OF THE INVENTION

1. Field of the Invention

The present invention relates to a wiring harness fixture for fixing a wiring harness to a panel composing a vehicle body.

2. Description of the Related Art

Various electronic devices are mounted on a vehicle. A wiring harness is wired in a vehicle for supplying electricity from a power source such as a battery, and for transmitting a control signal from a controller. The wiring harness includes a plurality of electric wires, and a connector attached to ends of the electric wires.

The electric wire is a so-called covered wire having a conductive core wire and an insulating cover for covering the core wire. The connector includes: a terminal electrically connected to the core wire of the electric wire; and an insulating connector housing for receiving the terminal. The connector is connected to a connector of the electronic device. Further, the wiring harness supplies the electricity and the various signals to the electronic device.

Conventionally, various wiring harness fixtures (for example, see Patent Documents 1 to 3) are used for fixing the wiring harness to a panel composing a vehicle body. The wiring harness fixture disclosed by the Patent Documents 1 to 3 includes: an attaching portion which the wiring harness is overlapped with and fixed to; a locking portion extending vertically from the attaching portion and allowed to be locked in a hole disposed on the panel; and a pressing portion for pressing the panel in a direction separating from the attaching portion when the locking portion is locked in the hole.

One end of the pressing portion is continued to the attaching portion, and provided around the locking portion. The pressing portion is inclined with respect to both a vertically extending direction of the locking portion from the attaching portion and a longitudinal direction of the wiring harness which is overlapped with the attaching portion. When the locking portion is locked in the hole, the other end of the pressing portion abuts on the panel and is elastically deformed in a direction where the other end moves close to the attaching portion. Then, an elastic restoring force is generated on the pressing portion for pressing in a direction where the panel moves away from the attaching portion.

The conventional wiring harness fixture disclosed in the Patent Document 1 to 3 is attached to a specific position of the wiring harness while an outer periphery of the attaching portion together with the wiring harness is wound by a tape or a band. Then, when the locking portion is press-fitted into the hole, and locked in the hole, and the pressing portion is elastically deformed as described above, the wiring harness fixture fixes the wiring harness to the panel.

[Patent Document 1] JP, A, 1111-182742
[Patent Document 2] JP, A, 2000-41322
[Patent Document 3] JP, A, 2002-174210

In the conventional wiring harness fixture, the pressing portion is extended from the attaching portion to the above-described direction. Therefore, after the wiring harness fixture is attached to the wiring harness, when the wiring harness is carried with the other wiring harness, these wiring harnesses may break into between the attaching portion and the pressing portion, and the wiring harnesses may be caught by the pressing portion. In this case, after the wiring harnesses are carried, when the wiring harnesses is tried to be removed forcedly, the wiring harness fixture may unexpectedly be broken, for example, the pressing portion may be broken out from the attaching portion.

Accordingly, an object of the present invention is to provide a wiring harness fixture configure to prevent the wiring harness from being caught and be broken unexpectedly.

SUMMARY OF THE INVENTION

In order to attain the object, according to the present invention, there is provided a wiring harness fixture for attaching a wiring harness to a panel of a vehicle body, said wiring harness fixture including:

an attaching portion configured to be overlapped with the wiring harness;

a locking portion extended vertically from the attaching portion and configured to be locked in a hole provided in the panel; and a pressing portion configured to press the panel in a direction away from the attaching portion when the locking portion is locked in the hole, wherein the pressing portion includes:

an inclined portion continued to the attaching portion and inclined with respect to both a vertically extending direction of the locking portion from the attaching portion and a longitudinal direction of the wiring harness overlapped with the attaching portion; and a parallel portion continued to the inclined portion and extended parallel to the locking portion from the inclined portion, and wherein a surface away from the panel of an intersecting portion continued to both the inclined portion and the parallel portion is disposed further away from the panel than a surface nearest the panel of the attaching portion.

Preferably, the locking portion is interposed between a pair of the pressing portions, and the inclined portions of the pair of pressing portions gradually approach each other as they extend away from the attaching portion.

These and other objects, features, and advantages of the present invention will become more apparent upon reading of the following detailed description along with the accompanied drawings.

DETAILED DESCRIPTION OF THE PREFERRED EMBODIMENTS

Hereinafter, a wiring clip 1 as a wiring harness fixture according to an embodiment of the present invention will be explained with reference to FIGS. 1 to 6. The wiring clip 1 as shown in FIG. 1 fixes a wiring harness 2 (shown by a two-dot chain line in FIG. 1) wired in a vehicle to a panel 3 composing a vehicle body of the vehicle.

The wiring harness 2 includes: a plurality of electric wires; and a connector attached to ends of the electric wire. The electric wire is a covered wire having a conductive core wire and an insulating cover for covering the core wire. The connector includes: a conductive terminal; and an insulating connector housing. The terminal is electrically connected to the core wire of the electric wire. The connector housing is formed in a box shape, and receives the terminal therein. The wiring harness 2 supplies electric power and various signals to various electronic devices by connecting the connector with connectors of the electronic devices. As shown in FIG. 1, a hole 4 is provided on the panel 3.

Figure 1:
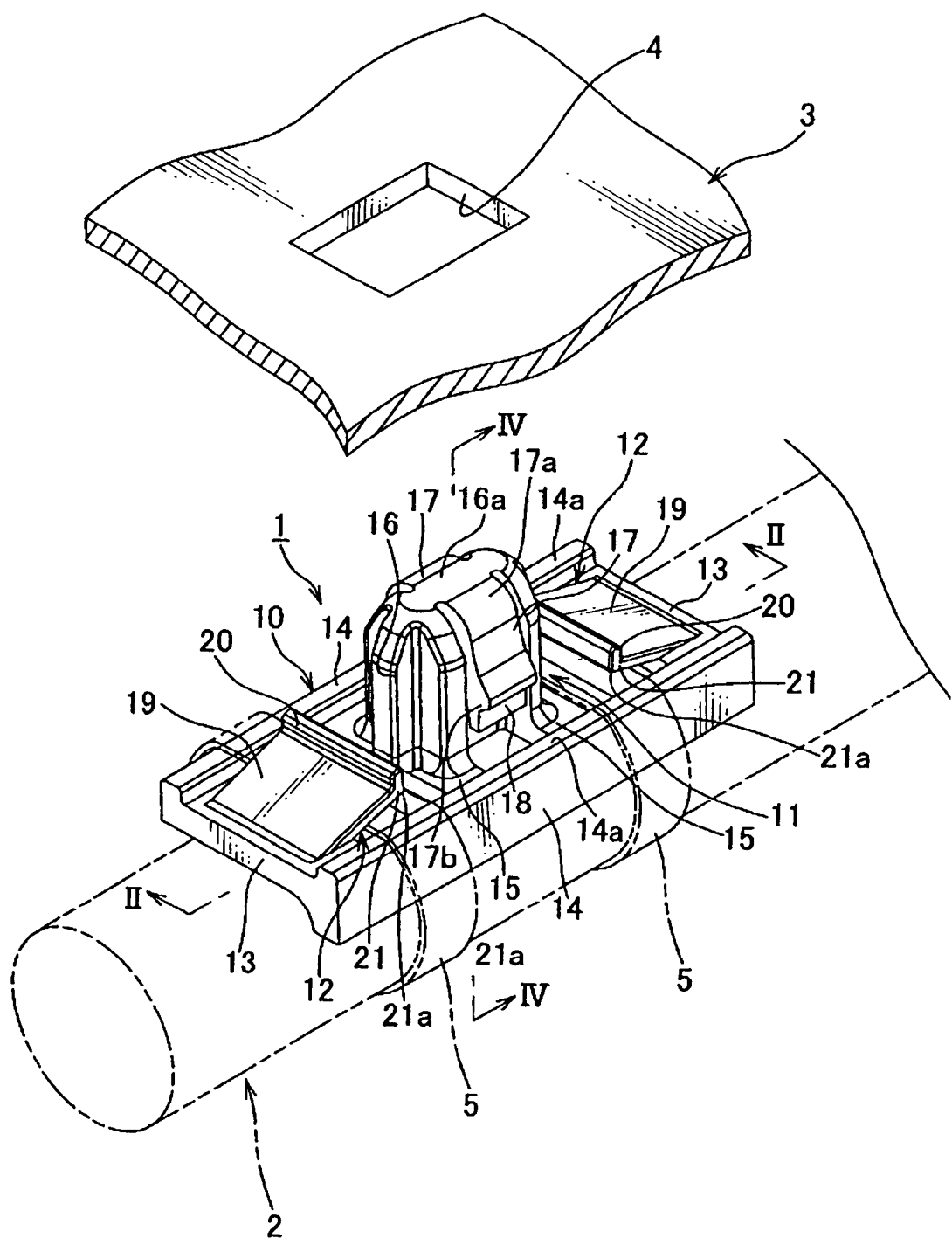
FIG. 1 is a perspective view showing a wiring clip and the like according to an embodiment of the present invention.
Figure 2:
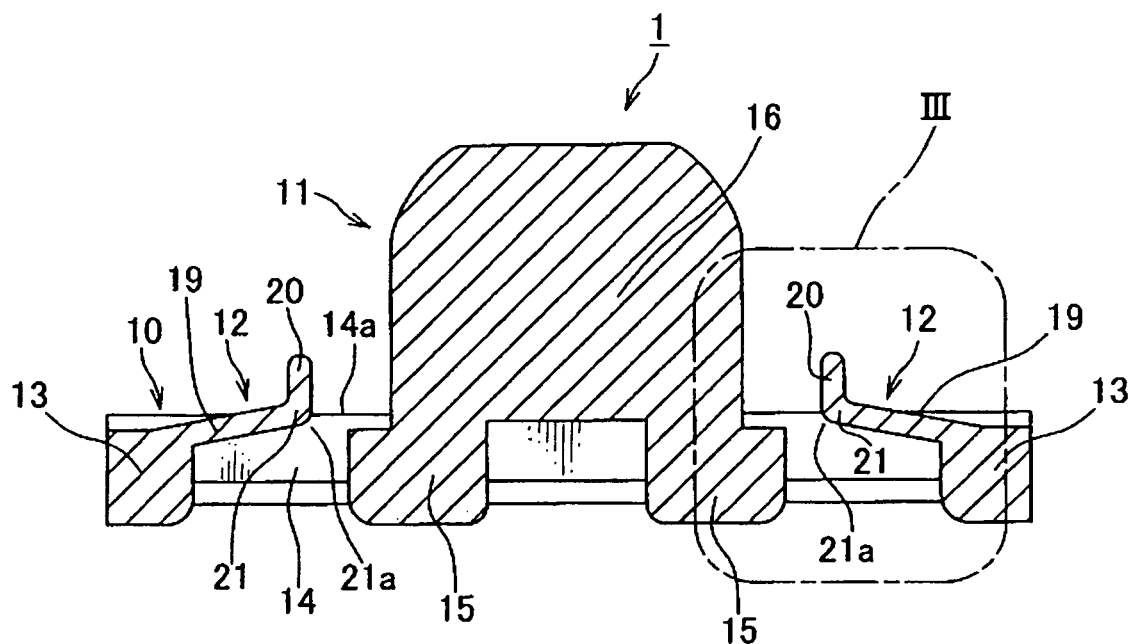
FIG. 2 is a sectional view taken on line II-II of FIG. 1.

The wiring clip 1 is made of synthetic resin, and as shown in FIGS. 1 and 2, integrally includes: a frame-shaped attaching portion 10; a locking portion 11 for locking with the hole 4; and a pair of pressing portions 12. The attaching portion 10 includes: a pair of short side members 13 parallel to each other with a gap; and a pair of long side members 14 parallel to each other with a gap and joining ends of the short side members 13. An outer edge of the attaching portion 10 is formed in a rectangular shape in a plan view.

The attaching portion 10 further includes a pair of connecting beams 15 for connecting the long side members 14 in the middle thereof in a longitudinal direction of the long side members 14, and parallel to the short side members 13. The attaching portion 10 is overlapped with the electric wires of the wiring harness 2 and wound by a tape 5 (shown by two-dot chain line in FIG. 1) together with the electric wires. The attaching portion 10 is fixed to the wiring harness 2. Incidentally, at this time, a longitudinal direction of the attaching portion 10 and a surface of the attaching portion 10 are parallel to an extending direction (longitudinal direction) of the wiring harness 2.

Figure 4:
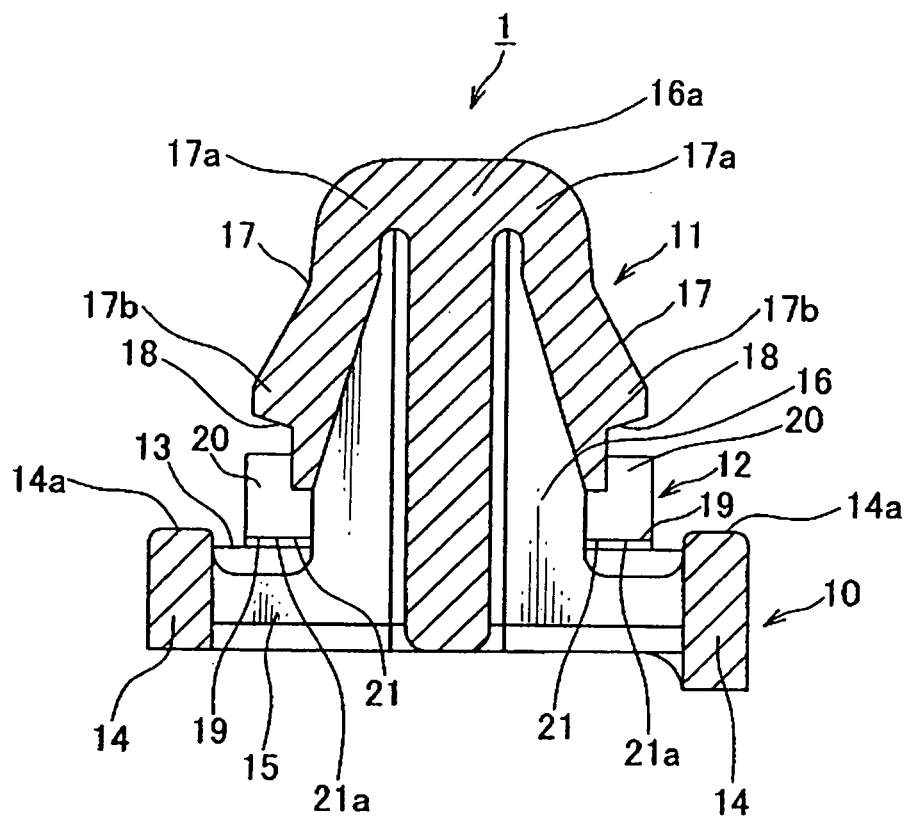
FIG. 4 is a sectional view taken on line IV-IV of FIG. 1.

As shown in FIG. 2, the locking portion 11 is extended vertically from a pair of connecting beams 15 of the attaching portion 10. As shown in FIG. 4, the locking portion 11 integrally includes: a vertically extended pillar 16 vertically extended from the pair of connecting beams 15; and a pair of locking pieces 17. The vertically extended pillar 16 is extended from the pair of connecting beams 15 of the attaching portion 10 in a direction perpendicular to a surface of the attaching portion 10.

An one end 17a of the pair of locking pieces 17 is continued to a tip 16a of the vertically extended pillar 16 away from the pair of connecting beams 15. Incidentally, the tip 16a is an end of the vertically extended pillar 16 away from the pair of connecting beams 15. The other ends 17b of the pair of locking pieces 17 are separated from each other, and separated from the vertically extended pillar 16.

The pair of locking pieces 17 is arranged in a manner that the locking pieces 17 gradually approach the attaching portion 10 as they extend from the one end 17a to the other end 17b. The pair of locking pieces 17 is gradually separated from each other and from the vertically extended pillar 16 as they extend from the one end 17a to the other end 17b. The pair of locking pieces 17 is formed in a chevron shape in a side view. A notch 18 is formed on the other end 17b of the locking piece 17. The notch 18 notches an outer edge of the other end 17b of the locking piece 17. The pair of locking pieces 17 is elastically deformable in a direction that the other ends 17b are moved close to each other.

Figure 6:
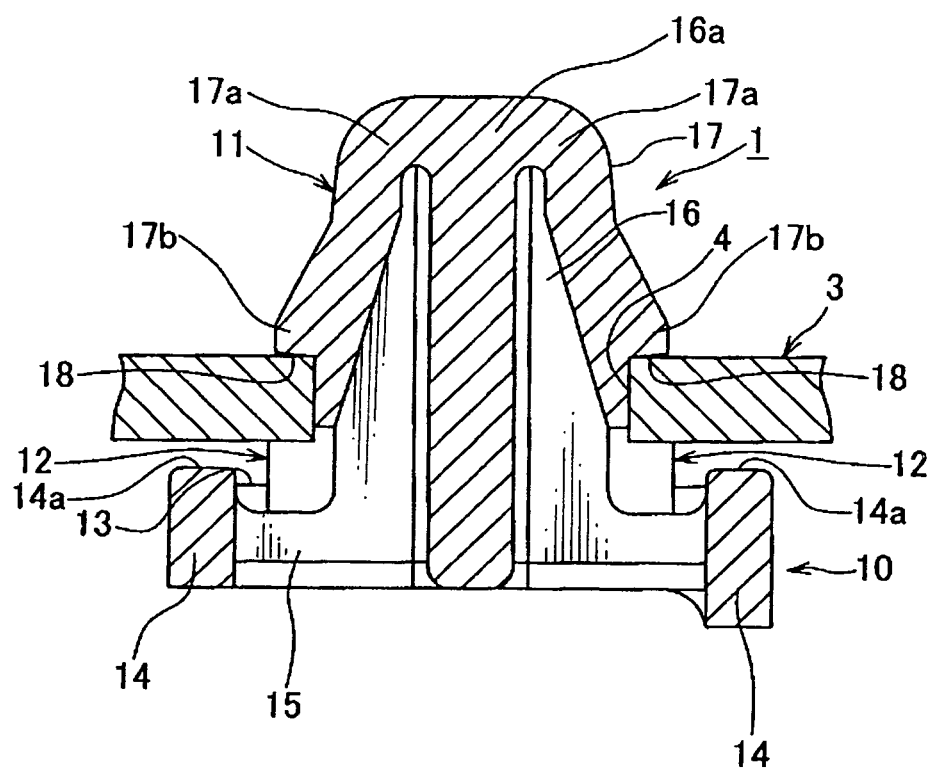
FIG. 6 is a sectional view showing the wiring clip of FIG. 4 attached to the panel.

When the locking portion 11 is press-fitted into the hole 4 of the panel 3, the locking pieces 17 are once elastically deformed in a direction that the other ends 17b are moved close to each other. Then, when the locking pieces 17 are passing through the hole 4, the other ends 17b are separated from each other due to the elastic restoring force. Further, the other ends 17b closely abut on an inner edge of the hole 4, and as shown in FIG. 6, the locking pieces 17 are locked with the inner edge of the hole 4 of the panel 3. Thus, the locking portion 11 is locked in the hole 4 of the panel 3, and the wiring harness 2 attached to the attaching portion 10 is fixed to the panel 3.

Figure 3:
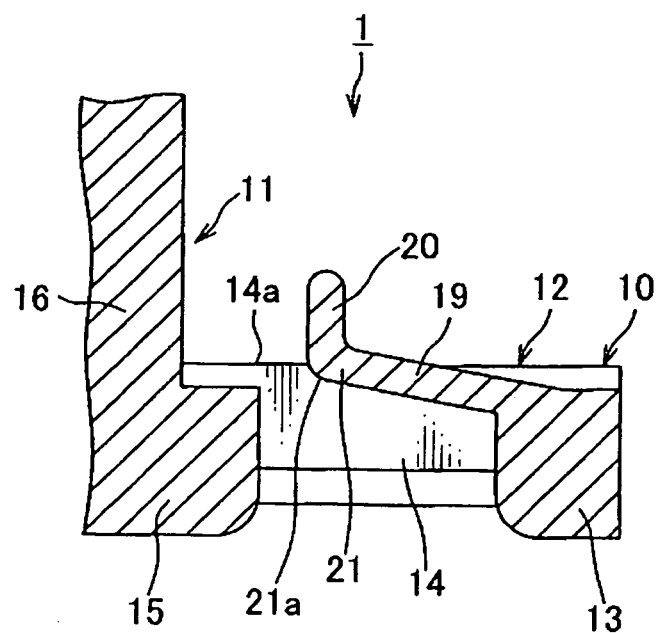
FIG. 3 is an enlarged sectional view showing the portion III of FIG. 2.

A pair of pressing portions 12 is arranged with a gap in a longitudinal direction of the attaching portion 10. The locking portion 11 is interposed between the pair of pressing portions 12. Each pressing portion 12 is formed in a plate shape, and as shown in FIGS. 2 and 3, integrally includes: an inclined portion 19; and a parallel portion 20. A one end of the inclined portion 19 is continued to the short side member 13. The pair of pressing portions 12 is extended from the short side members 13 in a manner that they approach each other and are gradually separated from the attaching portion 10. Namely, the inclined portions 19 of the pair of pressing portions 12 are extended in a direction gradually approaching each other as they extend away from the attaching portion 10. Thus, the inclined portion 19 is inclined with respect to both a vertically extending direction of the vertically extended pillar 16 of the locking portion 11 from the pair of connecting beams 15 of the attaching portion and a longitudinal direction of the wiring harness 2 attached to the attaching portion 10.

The parallel portion 20 is continued to the other end of the inclined portion 19 furthest away from the short side member 13 of the attaching portion 10, and extended from the other end of the inclined portion 19 parallel to the vertically extended pillar 16 of the locking portion 11 in a direction separating from the attaching portion 10. Therefore, the parallel portion 20 is extended toward the panel 3 parallel to the vertically extending direction of the vertically extended pillar 16 from the other end of the inclined portion 19.

Figure 5:
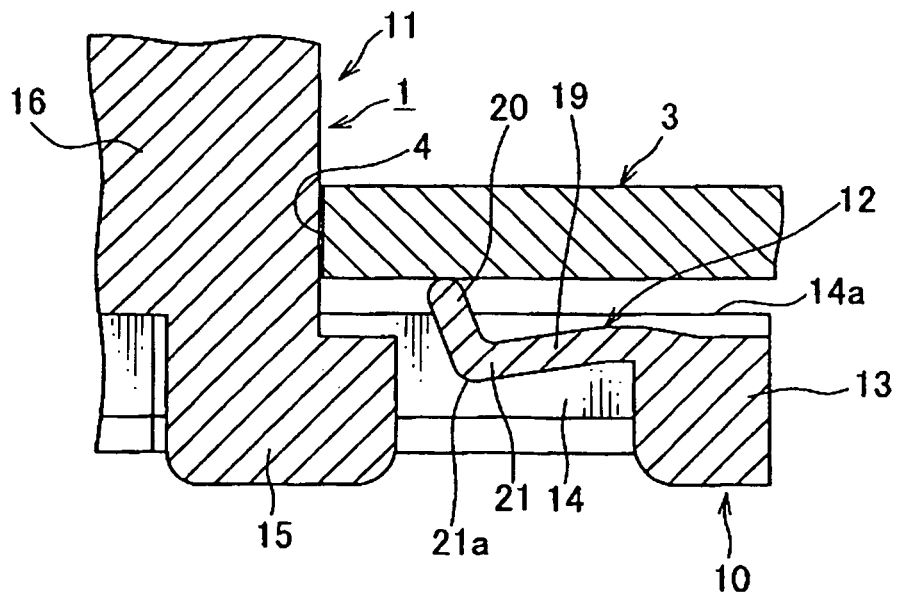
FIG. 5 is a sectional view showing the wiring clip of FIG. 3 attached to a panel.

When the locking portion 11 is locked in the hole 4 of the panel 3, as shown in FIG. 5, the tip of the parallel portion 20 of the pressing portions 12 is pressed by the panel 3 and elastically deformed to move close to the attaching portion 10. Then, an elastic restoring force of the pressing portions 12 is generated for pressing the panel 3 in a direction separating from the attaching portion 10. Thus, because such an elastic restoring force is generated, the pressing portions 12 prevents the attaching portion 10, namely, the wiring harness 2 attached to the panel 3 from rattling against the panel 3.

Further, as shown in FIG. 3, a surface 21a away from the panel 3 of an intersecting portion 21 continued to both the inclined portion 19 and the parallel portion 20 is disposed further away from the panel 3 than a surface 14a near the panel 3 of the long side members 14 of the attaching portion 10 as a surface nearest the panel 3 of the attaching portion 10.

The wiring clip 1 having the above-described structure fixes the wiring harness 2 to the panel 3 as described below. The electric wire of the wiring harness 2 is overlapped with the attaching portion 10, and the tape 5 or the like is wound around an outer periphery of the wiring harness 2 and the attaching portion 10. The wiring clip 1 is fixed to the wiring harness 2.

Then, the locking portion 11 faces the hole 4 of the panel 3. The locking portion 11 is inserted into the hole 4 from the one ends 17a of the pair of locking pieces 17 and the 16a of the vertically extended pillar 16. The pair of locking pieces 17 is once elastically deformed in a direction that the other ends 17b are moved close to each other. Then, when the other ends 17b of the pair of locking pieces 17 are inserted into the hole 4, the other ends 17b are moved away from each other due to the elastic restoring force.

Then, the notch 18 abuts on an inner edge of the hole 4. As shown in FIG. 6, the locking portion 11 is locked in the hole 4 provided on the panel 3. Further, as the locking portion 11 is press-fitted into the hole 4, the parallel portion 20 of the pressing portions 12 abuts on the panel 3, and the elastic restoring force is gradually generated for pushing the panel 3 in a direction separating from the attaching portion 10. Then, as shown in FIG. 5, while the elastic restoring force to push the panel 3 in a direction separating from the attaching portion 10 is generated, the locking portion 11 is locked with an inner edge of the hole 4. Thus, the wiring clip 1 fixes the wiring harness 2 to the panel 3.

According to this embodiment, the surface 21a away from the panel 3 of the intersecting portion 21 continued to both the inclined portion 19 and the parallel portion 20 is disposed further away from the panel 3 than the surface 14a of the long side members 14 of the attaching portion 10 as a surface nearest the panel 3 of the attaching portion 10. Therefore, the wiring harness 2 is prevented from entering between the inclined portion 19 of the pressing portions 12 and the attaching portion 10. Further, because the parallel portion 20 of the pressing portions 12 is extended parallel to the locking portion 11, the wiring harness 2 is prevented from being caught by the parallel portion 20. Therefore, the wiring clip 1 is prevented from unexpectedly be broken.

Further, the inclined portions 19 of the pair of pressing portions 12 are extended in a direction gradually approaching each other as they extend away from the attaching portion 10. Therefore, a distance between the other ends of the inclined portion 19 furthest away from the attaching portion 10 can be short. Therefore, the wiring clip 1 can be downsized. Further, because the distance between the other ends of the inclined portion 19 furthest away from the attaching portion 10 can be short, it becomes hard for the wiring harness 2 to enter between the inclined portion 19 of the pressing portions 12 and the locking portion 11. Therefore, the wiring harness 2 is prevented from being caught by the pressing portions 12, and the wiring clip 1 is further surely prevented from unexpectedly be broken.

Although the present invention has been fully described by way of example with reference to the accompanying drawings, it is to be understood that various changes and modifications will be apparent to those skilled in the art. Therefore, unless otherwise such changes and modifications depart from the scope of the present invention hereinafter defined, they should be construed as being included therein.

What is claimed is:

1. A wiring harness fixture for attaching a wiring harness to a panel of a vehicle body, said wiring harness fixture comprising:
    an attaching portion configured to be overlapped with the wiring harness;
    a locking portion extended vertically from the attaching portion and configured to be locked in a hole provided in the panel; and
    a pressing portion extended from the attaching portion and configured to press the panel in a direction away from the attaching portion when the locking portion is locked in the hole,
    wherein the pressing portion includes:
    an inclined portion connected to the attaching portion and inclined with respect to both a vertically extending direction of the locking portion from the attaching portion and a longitudinal direction of the wiring harness overlapped with the attaching portion; and
    a parallel portion connected to the inclined portion at an intersecting portion and extended parallel to the locking portion from the inclined portion, and
    wherein a surface of the intersecting portion away from the panel connected to to both the inclined portion and the parallel portion is disposed further away from the panel than a surface extending horizontally and nearest the panel of the attaching portion and the locking portion is projected vertically from a surface of the attaching portion.

2. The wiring harness fixture as claimed in claim 1, wherein the locking portion is interposed between a pair of the pressing portions, and the inclined portions of the pair of pressing portions gradually approach each other as they extend away from the attaching portion.

3. The wiring harness fixture as claimed in claim 1, wherein the parallel portion abuts on the panel.

* * * * *